Patented Aug. 23, 1949

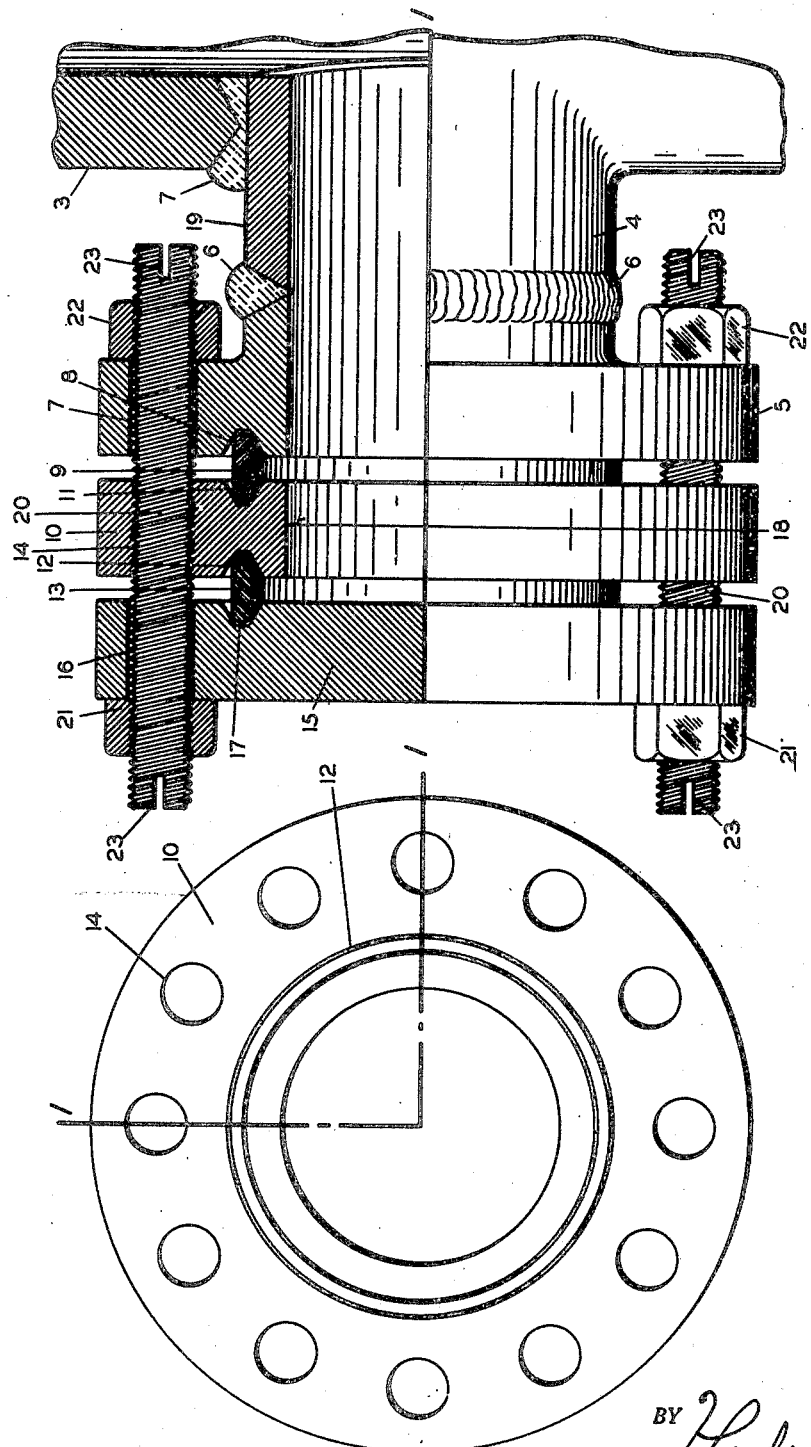

2,479,612

UNITED STATES PATENT OFFICE 2,479,612

CLOSURE ASSEMBLY

Joseph D. Glidden, Bartlesville, Okla., assignor to Phillips Petroleum Company, a corporation of Delaware Application August 31, 1945, Serial No. 613,755

2 Claims. (Cl. 220—46)

This invention relates to closures. In a more specific aspect, it relates to a nipple closure assembly for a vessel. In a still more specific aspect, it relates to a nipple closure assembly for a large pressure vessel in which it is necessary to open the closure for filling or emptying the vessel in which the vessel is likely to be injured in the operation.

In the prior art, difficulty has been experienced due to the failure of sealing means such as a ring joint on the nipple of a pressure vessel due to injury while the nipple is open. For example, the vessel may contain catalytic material and in removing the catalytic material through the nipple or supplying material to the vessel, the nipple flange may be injured by being struck with some object. As the nipple flange is integral with the pressure vessel, the flange cannot be removed without grave difficulty and it is extremely difficult to reshape the flange by machining it in place.

One object of the invention is to provide a nipple closure assembly having a ringe flange removably secured to the fixed flange of the vessel so that the removable ring flange will take the wear and tear when the nipple is open and will protect the fixed flange, whereby, upon said ring flange becoming worn it may be easily replaced.

Another object is to provide a suitable nipple closure assembly for a vessel.

Another object is to provide an easily replaceable nipple closure assembly which does not involve repair of the fixed portions of the vessel.

Numerous other objects and advantages will be apparent to those skilled in the art upon reading the accompanying specification, claims, and drawings.

In the drawings:

Figure 1 is an elevational view with parts in section showing a vessel having a nipple closure assembly embodying the present invention. The part in section Figure 1 is taken along the line 1—1 of Figure 2.

Figure 2 is an elevational view of the ring flange employed in Figure 1.

In Figure 1 a vessel 3 is provided with a nipple 4 having a fixed flange 5. Nipple 4 and flange 5 may be made integral with vessel 3 but generally are welded thereto by welds 6 and 7.

Fixed flange 5 has bolt holes 7 therein and a groove 8 for the reception of a sealing ring 9. Groove 8 has sloping walls and ring 9 has rounded edges which fit against the walls of groove 8. Such sealing rings are old in the art and any of this type sealing rings and sealing grooves may be employed in my invention. The ring 9 is generally of softer metal than flange 5 and generally the shape as is shown. However, it is not desired to limit the invention to the particular type of sealing ring and groove employed as any such hydraulic sealing means may be employed in my invention. I prefer the type of sealing ring shown as providing superior sealing qualities to such nipple closure assemblies.

A ring flange 10 is provided with a pair of sealing grooves 11 and 12 to receive rings 9 and 13. Flange 10 also has a screw threaded bolt hole 14.

A blind flange or cover plate 15 is provided with bolt hole 16 and a groove 17 to receive ring 13. Ring flange 10 is preferably provided with a central opening 18 which is preferably of the same diameter as the nipple opening 19 in nipple 4, but may be of a different diameter if desired. Theaded in threaded bolt holes 14 of flange 10 is a stud bolt 20. Stud bolt 20 extends through bolt holes 7 and 16 and threaded to stud bolt 20 are nuts 21 and 22. At least one end of stud bolt 20 is provided with a screw driver slot 23.

It is believed obvious that other means may be provided for securing flanges 5 and 10 and plate 15 together. For example, an ordinary nut and bolt assembly could be used or other securing means old in the art.

However, it is preferred to use the stud bolt assembly as shown in Figure 1 because such assembly gives superior results in adjustment of pressure on rings 9 and 13.

Operation

When it is desired to charge or discharge catalytic material from vessel 3, nuts 21 are unscrewed and cover plate 15 and ring 13 are removed. The charging and discharging then takes place through openings 18 and 19.

While the operation is performed carefully to avoid injuring ring groove 12 in the course of a number of such operations groove 12 is finally injured so that ring 13 no longer will seal against groove 12.

When this occurs, it is easy to unscrew nuts 22 and replace flange 10. Whereas, if groove 8 in flange 5 had been injured a difficult machining job would have arisen which would shut down vessel 3 for some time with resulting financial loss.

Nipple 4 is often at a somewhat inaccessible point and to perform machine operations on flange 5 is quite difficult. Also, flange 5 might become damaged so that no repair would be possible.

It is very important that vessel 3 operate at all times and to shut down the vessel for removal or repair of flange 5 would be too expensive in most cases.

By providing stud bolt 20 with a screw thread engagement with flange 10 and nuts 21 and 22 and screw driver slot 23, it is possible to adjust the forces on rings 9 and 13 independently. For example, ring 9 which is hardly ever disturbed may be set up rather tightly while ring 13 may be lightly pressured at first and the pressure on ring 13 increased at each loading or unloading operation.

While I have shown in the drawing the specific embodiment of my invention that I prefer and which I believe superior to other embodiments, it is obvious that numerous equivalent elements may be substituted and other changes made without departing from the scope of my invention which is defined only by the following claims.

Having described my invention, I claim:

1. A nipple closure assembly for a vessel comprising in combination a vessel nipple having a fixed flange thereon, said fixed flange having bolt holes and a ring groove therein, a first sealing ring in said groove, a ring flange having threaded bolt holes and a ring groove in each face disposed so that said first sealing ring is in one of the grooves of said ring flange, a second sealing ring in the other one of said grooves in said ring flange, a nipple cover plate having bolt holes and a ring groove disposed so that said second sealing ring is in the ring groove of said plate, and means securing said fixed flange, ring flange and plate in assembled relationship comprising stud bolts threaded in said threaded bolt holes of said ring flange and passing through said bolt holes of said plate and fixed flange, said stud bolts having screw driver slots in at least one end, and nuts on said stud bolts exterior of said fixed flange and said plate, said stud bolts being of smaller diameter than, and free to move freely longitudinally in as well as free to rotate freely in, all of said bolt holes except said threaded bolt holes of said ring flange.

2. A nipple closure assembly for a vessel comprising in combination a vessel nipple having a fixed flange thereon, said fixed flange having bolt holes and a ring groove therein, a first sealing ring in said groove, a ring flange having threaded bolt holes and a ring groove in each face disposed so that said first sealing ring is in one of the grooves of said ring flange, a second sealing ring in the other one of said grooves in said ring flange, a nipple cover plate having bolt holes and a ring groove disposed so that said second sealing ring is in the ring groove of said plate, and means securing said fixed flange, ring flange and plate in assembled relationship comprising stud bolts threaded in said threaded bolt holes of said ring flange and passing through said bolt holes of said plate and fixed flange, and nuts on said stud bolts exterior of said fixed flange and said plate, said stud bolts being of smaller diameter than, and free to move freely longitudinally in as well as free to rotate freely in, all of said bolt holes except said threaded bolt holes of said ring flange.

JOSEPH D. GLIDDEN.

REFERENCES CITED

The following references are of record in the file of this patent:

UNITED STATES PATENTS

| Number | Name | Date |
| --- | --- | --- |
| 1,071,585 | Rossell | Aug. 26, 1913 |
| 1,493,269 | Kruesi | May 6, 1924 |
| 1,691,609 | Oskrit | Nov. 13, 1928 |
| 1,990,189 | King | Feb. 5, 1935 |
| 2,330,425 | Hilton | Sept. 28, 1943 |